United States Patent
Yang et al.

(10) Patent No.: US 11,750,437 B2
(45) Date of Patent: Sep. 5, 2023

(54) CLUSTER NODE FAULT PROCESSING METHOD AND APPARATUS, AND DEVICE AND READABLE MEDIUM

(71) Applicant: INSPUR SUZHOU INTELLIGENT TECHNOLOGY CO., LTD., Suzhou Jiangsu (CN)

(72) Inventors: Hao Yang, Suzhou Jiangsu (CN); Xiangrui Meng, Suzhou Jiangsu (CN)

(73) Assignee: INSPUR SUZHOU INTELLIGENT TECHNOLOGY CO., LTD., Suzhou Jiangsu (CN)

( * ) Notice: Subject to any disclaimer, the term of this patent is extended or adjusted under 35 U.S.C. 154(b) by 0 days.

(21) Appl. No.: 17/928,041

(22) PCT Filed: Jan. 25, 2021

(86) PCT No.: PCT/CN2021/073494
§ 371 (c)(1),
(2) Date: Nov. 28, 2022

(87) PCT Pub. No.: WO2021/238275
PCT Pub. Date: Dec. 2, 2021

(65) Prior Publication Data
US 2023/0198828 A1    Jun. 22, 2023

(30) Foreign Application Priority Data
May 28, 2020    (CN) .......................... 202010465303.6

(51) Int. Cl.
*H04L 41/0631*    (2022.01)
*H04L 67/1097*    (2022.01)

(52) U.S. Cl.
CPC ...... *H04L 41/0631* (2013.01); *H04L 67/1097* (2013.01)

(58) Field of Classification Search
CPC .................................................. H04L 41/0631
See application file for complete search history.

(56) References Cited

U.S. PATENT DOCUMENTS

2017/0116301 A1* 4/2017 Cowling ............... G06F 16/273
2019/0394266 A1* 12/2019 Fukuyama .......... H04L 67/1044

FOREIGN PATENT DOCUMENTS

CN      107547252 A         1/2018
CN      107817951 A    *    3/2018    .......... G06F 11/1448
(Continued)

OTHER PUBLICATIONS

Search report for International application No. PCT/CN2021/073494 dated Apr. 27, 2021.
(Continued)

*Primary Examiner* — Philip C Lee
(74) *Attorney, Agent, or Firm* — Dennemeyer & Associates LLC; Victoria Friedman

(57) ABSTRACT

A method and apparatus for processing cluster node failure, a computer device and a readable storage medium. The method includes: circularly acquiring state information of multiple nodes in a cluster, and on the basis of the state information, determining whether a corresponding node fails; in response to failure of the node, sending failure information to multiple OSDs under the node; in response to the multiple OSDs receiving the failure information, according to the failure information, selecting a Monitor to send down information, and setting states of the multiple OSDs to be down; and in response to the Monitor receiving the down information, updating an OSDMap on the basis of the down information, and sending the updated OSDMap to OSDs under other nodes.

20 Claims, 2 Drawing Sheets

(56) References Cited

FOREIGN PATENT DOCUMENTS

| | | | | |
|---|---|---|---|---|
| CN | 108121510 A | * | 6/2018 | |
| CN | 108494585 A | | 9/2018 | |
| CN | 108509153 A | * | 9/2018 | ........... G06F 3/0604 |
| CN | 109101357 A | * | 12/2018 | |
| CN | 109101357 A | | 12/2018 | |
| CN | 109274544 A | | 1/2019 | |
| CN | 109495543 A | | 3/2019 | |
| CN | 109656895 A | * | 4/2019 | |
| CN | 109656896 A | * | 4/2019 | |
| CN | 110740064 A | | 1/2020 | |
| CN | 110895521 A | * | 3/2020 | |
| CN | 110895521 A | | 3/2020 | |
| CN | 111756571 A | | 10/2020 | |

OTHER PUBLICATIONS

Search report for Chinese application No. 202010465303.6 filed on May 28, 2020.

* cited by examiner

CLUSTER NODE FAULT PROCESSING METHOD AND APPARATUS, AND DEVICE AND READABLE MEDIUM

CROSS-REFERENCE TO RELATED APPLICATION

The present disclosure claims priority to Chinese Patent Application No. 202010465303.6, filed to the China National Intellectual Property Administration on May 28, 2020 and entitled "Method and Apparatus for Processing Cluster Node Failure, Device, and Readable Medium", which is incorporated herein by reference in its entirety.

TECHNICAL FIELD

The present disclosure relates to the technical field of storage systems, and in particular, to a method and apparatus for processing cluster node failure, a device, and a computer readable medium.

BACKGROUND

In a distributed storage system, if a cluster node fails, at this time, a Monitor (Mon) and Object-based Storage Devices (OSDs) on the failure node will stop normal working, while Mons and OSDs deployed on the other nodes cannot sense the failure in time.

In the related art, Mons of the other nodes sense the failure of this Mon node by relying on a message mechanism connected between Mons. In this message mechanism, a message is sent once every 2 s, only when the other Mon nodes do not receive a message of the faulty Mon node for five continuous times, will the other Mons determine that this Mon fails and mark the Mon to be a Down state, and then the remaining Mons will re-trigger election and then select a primary Mon node. However, the communication between an OSD and other OSDs relies on a heartbeat mechanism. Only when the interruption of mutual heartbeat communication time between these OSDs exceeds 1 minute, can OSDs of other nodes sense that the OSDs on the failure node have a problem and report a failure message thereof to the primary Mon. Only at this time, can an OSDMap be changed, and OSDs on the failure node are marked to be a Down state.

In the related art, the time from failure of a Mon and OSDs to the failure being sensed, and then being marked to be a Down state, is too long, which causes long-time stagnation of a service at a front end, seriously affecting the user experience and the data reading and writing capability of the front end.

SUMMARY

In view of this, an object of embodiments of the present disclosure is to provide a method and apparatus for processing cluster node failure, a device, and a readable medium, which relate to an optimized method in which by detecting states of nodes and sharing states of OSDs and a Monitor under a failure node to the other nodes, the time of the other nodes sensing the failure node is reduced, thereby avoiding long-time stagnation effect on a service at a front end.

On the basis of the object, one aspect of embodiments of the present disclosure provides a method for processing cluster node failure, including the following steps: circularly acquiring state information of multiple nodes in a cluster, and on the basis of the state information, determining whether a corresponding node fails; in response to failure of the node, sending failure information to multiple OSDs under the node; in response to the multiple OSDs receiving the failure information, according to the failure information, selecting a Monitor to send down information, and setting states of the multiple OSDs to be down; and in response to the Monitor receiving the down information, updating an OSDMap on the basis of the down information, and sending the updated OSDMap to OSDs under other nodes.

In some embodiments, in response to failure of the node, sending failure information to multiple OSDs under the node includes: determining whether a corresponding primary Monitor is normal according to a failure node; in response to the primary Monitor being normal, sending node failure information to the multiple OSDs under the node; and in response to the primary Monitor being abnormal, sending Monitor failure information to the multiple OSDs under the node.

In some embodiments, determining whether a corresponding primary Monitor is normal according to a failure node includes: determining whether other nodes connected to the corresponding primary Monitor are failure nodes; and in response to any one node in the other nodes connected to the primary Monitor is not a failure node, confirming that the primary Monitor is normal.

In some embodiments, the method further includes: in response to all the other nodes connected to the primary Monitor being failure nodes, confirming that the primary Monitor is abnormal, and setting the state of the primary Monitor to be down.

In some embodiments, according to the failure information, selecting a Monitor to send down information includes: in response to the failure information being node failure information, selecting a primary Monitor to send the down information.

In some embodiments, according to the failure information, selecting a Monitor to send down information includes: in response to the failure information being primary Monitor failure information, selecting a standby Monitor to send the down information; and electing a new primary Monitor, and the standby Monitor synchronizing the down information to the new primary Monitor.

According to another aspect of embodiments of the present disclosure, an apparatus for processing cluster node failure is further provided, including: a detection module, configured to circularly acquire state information of multiple nodes in a cluster, and on the basis of the state information, determine whether a corresponding node fails; a first determination module, configured to in response to failure of the node, send failure information to multiple OSDs under the node; a second determination module, configured to in response to the multiple OSDs receiving the failure information, according to the failure information, select a Monitor to send down information, and set states of the multiple OSDs to be down; and a processing module, configured to in response to the Monitor receiving the down information, update an OSDMap on the basis of the down information, and send the updated OSDMap to OSDs under other nodes.

In some embodiments, the first determination module is further configured to: determine whether a corresponding primary Monitor is normal according to a failure node; in response to the primary Monitor being normal, send node failure information to the multiple OSDs under the node; and in response to the primary Monitor being abnormal, send Monitor failure information to the multiple OSDs under the node.

Another aspect of embodiments of the present disclosure further provides a computer device, including: at least one processor; and a memory, wherein the memory stores computer instructions that can be run on the processor, and the instructions, when executed by the processor, implement the steps of the described method.

Still another aspect of embodiments of the present disclosure also provides a computer-readable storage medium, wherein the computer-readable storage medium stores a computer program for implementing the described method steps when being executed by a processor.

Some embodiments of the present disclosure have the following beneficial technical effects: by detecting states of nodes and sharing states of OSDs and a Monitor under a failure node to the other nodes, the time of the other nodes sensing the failure node is reduced, thereby avoiding long-time stagnation effect on a service at a front end.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to some embodiments of the present disclosure, and for a person of ordinary skill in the art, other embodiments can also be derived from these accompanying drawings without involving any inventive effort.

DETAILED DESCRIPTION OF THE EMBODIMENTS

To make the objects, technical solutions, and advantages of some embodiments of the present disclosure clearer, hereinafter, embodiments of the present disclosure are further described in detail in combination with specific embodiments and with reference to the accompanying drawings.

It should be noted that in the embodiments of the present disclosure, all expressions using "first" and "second" are used to distinguish two entities having the same names but are different or different parameters. Hence, "first" and "second" are only used for convenience of expression, should not be understood as limitations to embodiments of the present disclosure, and this will not be described one by one in subsequent embodiments.

Figure 1:
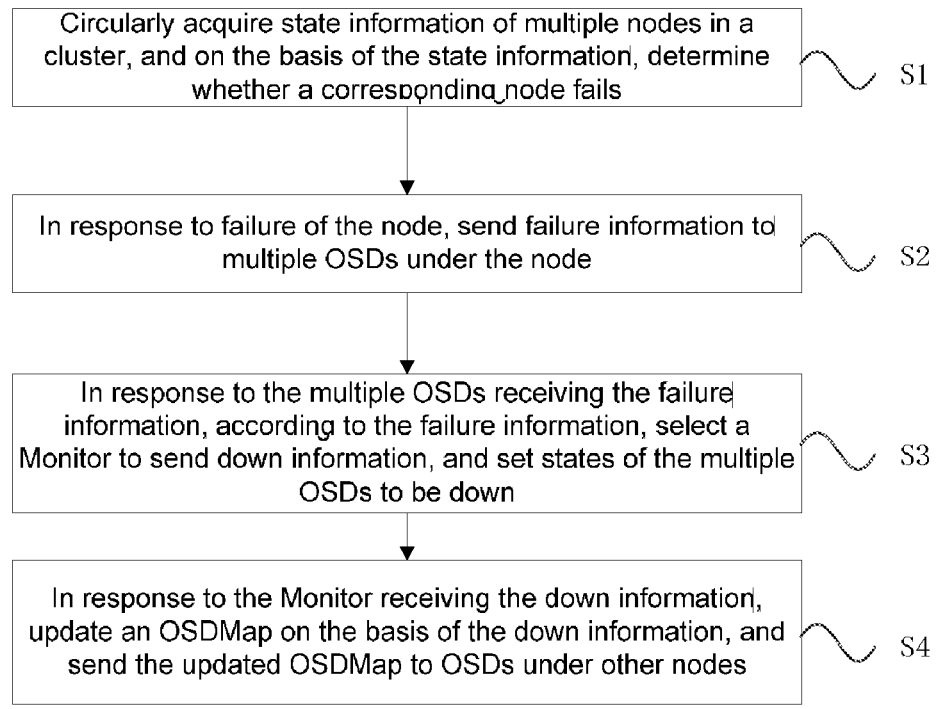
FIG. 1 is a schematic diagram of embodiments of a method for processing cluster node failure provided in some embodiments of the present disclosure.

On the basis of the object, a first aspect of embodiments of the present disclosure provides embodiments of a method for processing cluster node failure. FIG. 1 shows a schematic diagram of embodiments of a method for processing cluster node failure provided in some embodiments of the present disclosure. As shown in FIG. 1, embodiments of the present disclosure include the following steps:

S1, circularly acquiring state information of multiple nodes in a cluster, and on the basis of the state information, determining whether a corresponding node fails;

S2, in response to failure of the node, sending failure information to multiple OSDs under the node;

S3, in response to the multiple OSDs receiving the failure information, according to the failure information, selecting a Monitor to send down information, and setting states of the multiple OSDs to be down; and S4, in response to the Monitor receiving the down information, an OSDMap is updated on the basis of the down information, and the updated OSDMap is sent to OSDs under other nodes.

In this embodiment, a C++ high-level language and a Shell script language are used to implement specific functions, wherein OSD (Object-based Storage Device) refers to an object-based storage device, and the main functions thereof include storing data, processing replication, recovery and replenishment of data and balancing data distribution, and providing some relevant data to a Monitor; Monitor refers to a monitor, and the main functions are to maintain the health state of the whole cluster and to provide a consistent decision; and OSDMap refers to a map of object-based storage devices, and stores information of all OSDs in a cluster, and all changes of OSD nodes, such as process exit, node addition or exit, or changes of node weights, are reflected on the OSDMap.

Each node under cluster nodes corresponds to multiple OSDs, and one Monitor may be deployed on a plurality of nodes: when a certain node under a Monitor fails, the Monitor is normal; and when all nodes under a Monitor fail, the Monitor is abnormal.

In this embodiment, if OSDs under a failure node and a Monitor deployed on the node do not fail at the same time, the OSDs send down information to the Monitor to inform that the Monitor is to be down, and states of the OSDs are sets to be down; and upon receiving the down information, the Monitor updates an OSDMap on the basis of the down information, and sends the updated OSDMap to OSDs under other nodes.

In this embodiment, when OSDs under a failure node and a Monitor deployed on the node fail at the same time, the OSDs send down information to other Monitors; and upon receiving the down information, the other Monitors will deploy a new Monitor for the node, and synchronize a message to the new Monitor.

In some embodiments of the present disclosure, in response to failure of the node, sending failure information to multiple OSDs under the node includes: determining whether a corresponding primary Monitor is normal according to a failure node; in response to the primary Monitor being normal, sending node failure information to the multiple OSDs under the node; and in response to the primary Monitor being abnormal, sending Monitor failure information to the multiple OSDs under the node.

In this embodiment, the node failure includes active breakpoint or an IPMI having a power-off operation. IPMI (Intelligent Platform Management Interface) refers to an intelligent platform management interface, and is an industrial standard used for managing peripheral devices used in enterprise systems based on Intel structures. A user can monitor physical health characteristics (such as temperature, voltage, fan working state and power source state) of a server by using IPMI. If a node fails, then OSDs under the node will also fail correspondingly.

In some embodiments of the present disclosure, determining whether a corresponding primary Monitor is normal according to a failure node includes: determining whether other nodes connected to the corresponding primary Monitor are failure nodes; and in response to any one node in the other nodes connected to the primary Monitor is not a failure node, confirming that the primary Monitor is normal. One Monitor can be deployed on a plurality of nodes, and when a certain node under a Monitor fails, the Monitor is normal.

In some embodiments of the present disclosure, the method further includes: in response to all the other nodes connected to the primary Monitor being failure nodes, confirming that the primary Monitor is abnormal, and setting the state of the primary Monitor to be down. One Monitor can be deployed on a plurality of nodes, and when all nodes under a Monitor fail, the Monitor is abnormal.

In some embodiments of the present disclosure, according to the failure information, selecting a Monitor to send down information includes: in response to the failure information being node failure information, selecting a primary Monitor to send the down information.

In some embodiments of the present disclosure, according to the failure information, selecting a Monitor to send down information includes: in response to the failure information being primary Monitor failure information, selecting a standby Monitor to send the down information; and electing a new primary Monitor, and the standby Monitor synchronizing the down information to the new primary Monitor.

It should be particularly pointed out that all steps in embodiments of the method for processing cluster node failure may be crossed, replaced, added, or deleted. Therefore, regarding the method for processing cluster node failure, these reasonable permutations, combination and transformation should also belong to the scope of protection of some embodiments of the present disclosure, and should not limit the scope of protection of some embodiments of the present disclosure to the embodiments.

Figure 2:
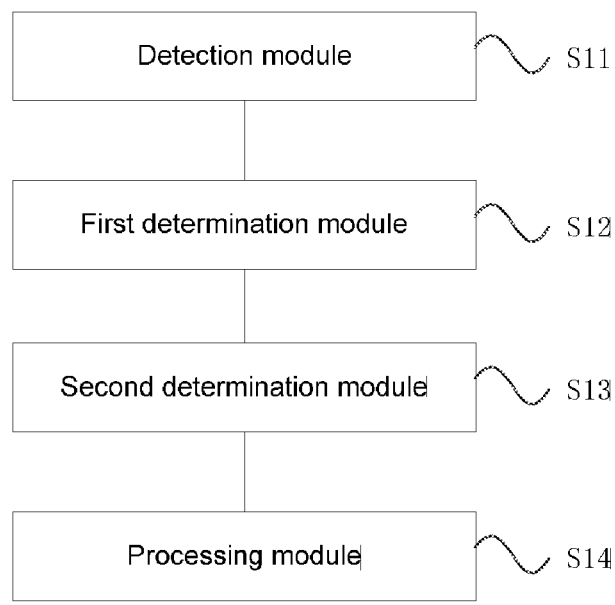
FIG. 2 is a schematic diagram of embodiments of an apparatus for processing cluster node failure provided in some embodiments of the present disclosure.

On the basis of the object, a second aspect of embodiments of the present disclosure provides an apparatus for processing cluster node failure. FIG. 2 shows a schematic diagram of embodiments of an apparatus for processing cluster node failure provided in some embodiments of the present disclosure. As shown in FIG. 2, embodiments of the present disclosure include the following modules: a detection module S11, configured to circularly acquire state information of multiple nodes in a cluster, and on the basis of the state information, determine whether a corresponding node fails; a first determination module S12, configured to in response to failure of the node, send failure information to multiple OSDs under the node; a second determination module S13, configured to in response to the multiple OSDs receiving the failure information, according to the failure information, select a Monitor to send down information, and set states of the multiple OSDs to be down; and a processing module S14, configured to in response to the Monitor receiving the down information, update an OSDMap on the basis of the down information, and send the updated OSDMap to OSDs under other nodes.

In some embodiments of the present disclosure, the first determination module S12 is further configured to: determine whether a corresponding primary Monitor is normal according to a failure node; in response to the primary Monitor being normal, send node failure information to the multiple OSDs under the node; and in response to the primary Monitor being abnormal, send Monitor failure information to the multiple OSDs under the node.

Figure 3:
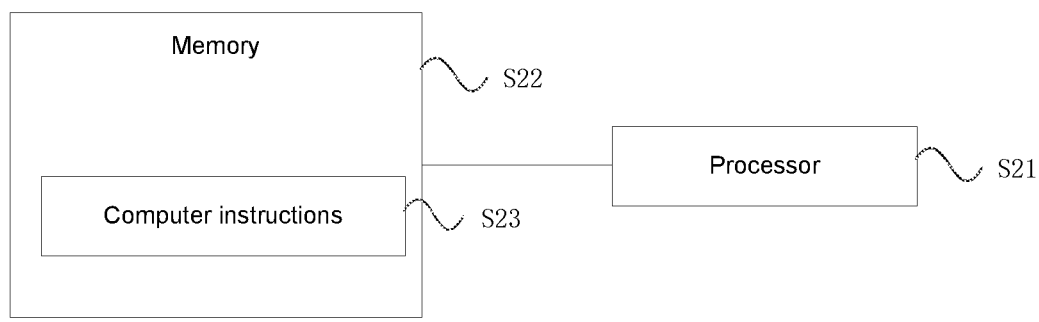
FIG. 3 is a schematic diagram of embodiments of a computer device provided in some embodiments of the present disclosure.

On the basis of the object, a third aspect of embodiments of the present disclosure provides a computer device. FIG. 3 shows a schematic diagram of embodiments of a computer device provided in some embodiments of the present disclosure. As shown in FIG. 3, embodiments of the present disclosure include the following apparatuses: at least one processor S21; and a memory S22, wherein the memory S22 stores computer instructions S23 that can be run on the processor, and the instructions, when executed by the processor, implement the steps of the described method.

Figure 4:
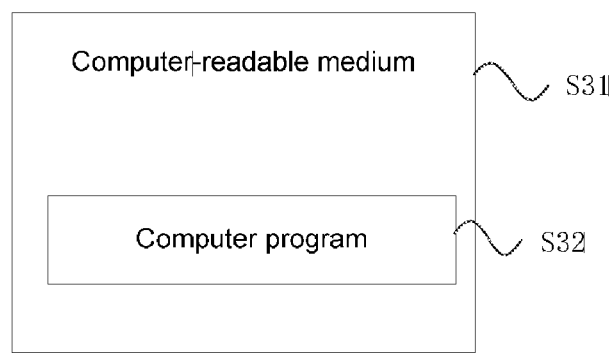
FIG. 4 is a schematic diagram of embodiments of a computer-readable storage medium provided in some embodiments of the present disclosure.

Some embodiments of the present disclosure further provide a computer-readable storage medium. FIG. 4 is a schematic diagram of embodiments of a computer-readable storage medium provided in some embodiments of the present disclosure. As shown in FIG. 4, the computer-readable storage medium S31 stores a computer program S32 for executing the described method when being executed by a processor.

Finally, it should be noted that a person of ordinary skill in the art may understand that all or a part of the processes of the methods in the embodiments may be completed by a computer program instructing relevant hardware. The program of the method for processing cluster node failure may be stored in a computer-readable storage medium, and when the program is executed, the processes of the embodiments of the method may be included. A storage medium of the program may be a magnetic disk, an optical disk, a read-only memory (ROM), or a random access memory (RAM), etc. The embodiments of the computer program may achieve the same or similar effects as any method embodiments corresponding thereto.

In addition, the method disclosed according to the embodiments of the present disclosure may also be implemented as a computer program executed by a processor, and the computer program may be stored in a computer-readable storage medium. When the computer program is executed by the processor, the functions defined in the method disclosed in the embodiments of the present disclosure are executed.

Furthermore, the method steps and system units may also be implemented by using a controller and a computer-readable storage medium for storing a computer program which causes the controller to implement the steps or unit functions as described above.

Furthermore, it should be understood that the computer-readable storage medium (e.g. memory) herein may be volatile memory or non-volatile memory, or may include both volatile memory and non-volatile memory. By way of example and not limitation, non-volatile memory may include read-only memory (ROM), programmable ROM (PROM), electrically programmable ROM (EPROM), electrically erasable programmable ROM (EEPROM), or flash memory. Volatile memory may include random access memory (RAM), the RAM may act as an external cache memory. By way of example and not limitation, RAM may be available in a variety of forms, such as synchronous RAM (DRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). The storage devices of the disclosed aspects are intended to include, but are not limited to, these and other suitable types of memories.

A person skilled in the art would further understand that various illustrative logical blocks, modules, circuits, and algorithm steps described in connection with the disclosure herein may be implemented as electronic hardware, computer software, or a combination of both. To clearly illustrate the interchangeability of hardware and software, general illustration has been made regarding the functions of various illustrative assemblies, blocks, modules, circuits and steps. Whether such functions are implemented as software or implemented as hardware depends upon the particular application, and design constraints imposed on the overall system. A person skilled in the art could implement functions in various ways regarding each particular application, but such implementation decisions should not be interpreted as causing a departure from the scope of the disclosure of the embodiments of the disclosure.

Various illustrative logical blocks, modules and circuits described in connection with the disclosure herein may be implemented or executed by using the following components designed to execute the functions herein: a general purpose processor, a digital signal processor (DSP), an application specific integrated circuit (ASIC), a field programmable gate array (FPGA) or other programmable logic device, discrete gate or transistor logic, discrete hardware components, or any combinations of these components. The general purpose processor may be a microprocessor, but alternatively, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP, and/or any other such configurations.

The steps of the method or algorithm described in connection with the disclosure herein may be directly included in hardware, in a software module executed by a processor, or in a combination of the two. The software module may reside in an RAM, a flash memory, an ROM, an EPROM, an EEPROM, a register, a hard disk, a removable disk, a CD-ROM, or any other forms of storage media known in the art. An exemplary storage medium is coupled to the processor, such that the processor can read information from the storage medium, or write information to the storage medium. In an alternative solution, the storage medium may be integrated with the processor. The processor and the storage medium may reside in an ASIC. The ASIC may reside in a user terminal. In an alternative solution, the processor and the storage medium may reside as discrete assemblies in a user terminal.

In one or more exemplary designs, the functions may be implemented in hardware, software, firmware, or any combination thereof. If implemented in software, the functions may be stored on a computer-readable medium as one or more instructions or codes or be transmitted via a computer-readable medium. The computer-readable medium includes a computer storage medium and a communication medium, the communication medium including any medium that facilitates transfer of a computer program from one location to another. The storage medium may be any available medium that can be accessed by a general purpose computer or special purpose computer. By way of example and not limitation, the computer-readable medium can include RAM, ROM, EEPROM, CD-ROM or other optical disk storage devices, magnetic disk storage devices or other magnetic storage devices, or any other media that can be used to carry or store desired program codes in the form of instructions or data structures and that can be accessed by a general purpose or special purpose computer, or a general purpose or special purpose processor. In addition, any connection may be properly referred to as a computer-readable medium. For example, if software is sent from a website, a server, or other remote sources by using a coaxial cable, optical fiber cable, twisted pair, digital subscriber line (DSL), or wireless technologies such as infrared, radio and microwave, then the coaxial cable, optical fiber cable, twisted pair, DSL, or wireless technologies such as infrared, radio and microwave are all included in the definition of a medium. As used herein, a magnetic disk and an optical disk include compact disk (CD), laser disk, optical disk, digital versatile disk (DVD), floppy disk and Blu-Ray disk, wherein the magnetic disk usually reproduces data magnetically, while the optical disk reproduces data optically by using lasers. Combinations of the content above should also be included within the scope of computer-readable media.

The content above merely relates to exemplary embodiments of the present disclosure, but it should be noted that various changes and modifications could be made without departing from the scope disclosed in the embodiments of the present disclosure as defined in the appended claims. The functions, steps and/or actions of the method claim in accordance with the disclosed embodiments described herein need not be performed in any particular sequence. In addition, although elements disclosed in the embodiments of the present disclosure may be described or claimed in an individual form, unless explicitly limited to a singular number, it is also understood that there may be multiple elements.

It should be understood that as used herein, the singular form "a (an)" are intended to include plural forms as well, unless the context clearly supports exceptions. It should also be understood that "and/or" as used herein refers to any and all possible combinations including one or more associated items listed.

The serial numbers of the embodiments disclosed in the embodiments of the present disclosure are only for description, and do not represent the preference of the embodiments.

A person of ordinary skill in the art may understand that all or a part of the steps of the embodiments may be implemented by hardware, or may be implemented by a program instructing relevant hardware. The program may be stored in a computer-readable storage medium. The storage medium may be a read-only memory, a magnetic disk, or an optical disk.

It should be understood by a person of ordinary skill in the art that the discussion of any embodiment above is merely exemplary, and is not intended to imply that the scope (including the claims) disclosed in embodiments of the present disclosure is limited to these examples. Under the idea of the embodiments of the present disclosure, technical features in the described embodiments or in different embodiments may also be combined, and there are many other variations of different aspects of the embodiments of the present disclosure, but for simplicity, they are not provided in detail. Therefore, any omissions, modifications, equivalent replacements, improvements, etc. made within the spirit and principle of embodiments of the present disclosure shall all fall within the scope of protection of embodiments of the present disclosure.

What is claimed is:

1. A method for processing cluster node failure, comprising:
    circularly acquiring state information of multiple nodes in a cluster, and on basis of the state information, determining whether a corresponding node fails;
    in response to failure of the node, sending failure information to multiple Object-based Storage Devices (OSDs) under the node;

in response to the multiple OSDs receiving the failure information, according to the failure information, selecting a Monitor to send down information, and setting states of the multiple OSDs to be down; and in response to the Monitor receiving the down information, updating an OSDMap on basis of the down information, and sending the updated OSDMap to OSDs under other nodes of the multiple nodes;

wherein in response to failure of the node, sending failure information to multiple OSDs under the node comprises:

determining whether a corresponding primary Monitor is normal according to a failure node;

in response to the corresponding primary Monitor being abnormal, sending Monitor failure information to the multiple OSDs under the node.

2. The method for processing cluster node failure according to claim 1, further comprising:
in response to the corresponding primary Monitor being normal, sending node failure information to the multiple OSDs under the node.

3. The method for processing cluster node failure according to claim 1, wherein determining whether the corresponding primary Monitor is normal according to a failure node comprises:
determining whether the other nodes connected to the corresponding primary Monitor are failure nodes; and
in response to any one node in the other nodes connected to the corresponding primary Monitor is not a failure node, confirming that the corresponding primary Monitor is normal.

4. The method for processing cluster node failure according to claim 3, wherein the method further comprises:
in response to all the other nodes connected to the corresponding primary Monitor being failure nodes, confirming that the corresponding primary Monitor is abnormal, and setting a state of the corresponding primary Monitor to be down.

5. The method for processing cluster node failure according to claim 1, wherein according to the failure information, selecting a Monitor to send down information comprises:
in response to the failure information being node failure information, selecting the corresponding primary Monitor to send the down information.

6. The method for processing cluster node failure according to claim 1, wherein according to the failure information, selecting a Monitor to send down information comprises:
in response to the failure information being primary Monitor failure information, selecting a standby Monitor to send the down information; and
selecting a new primary Monitor, and the standby Monitor synchronizing the down information to the new primary Monitor.

7. A computer device, comprising:
at least one processor; and
a memory, wherein the memory stores computer instructions that is executed executable by the at least one processor, and upon execution by the at least one processor, is configured to cause the at least processor:
circularly acquire state information of multiple nodes in a cluster, and on the basis of the state information, determine whether a corresponding node fails;
in response to failure of the node, send failure information to multiple Object-based Storage Devices (OSDs) under the node;
in response to the multiple OSDs receiving the failure information, according to the failure information, select a Monitor to send down information, and setting states of the multiple OSDs to be down; and
in response to the Monitor receiving the down information, update an OSDMap on basis of the down information, and send the updated OSDMap to OSDs under other nodes of the multiple nodes;
determine whether a corresponding primary Monitor is normal according to a failure node;
in response to the corresponding primary Monitor being abnormal, send Monitor failure information to the multiple OSDs under the node.

8. A computer-readable storage medium, storing a computer program, when executed by at least one processor, cause the at least processor to:
circularly acquire state information of multiple nodes in a cluster, and on the basis of the state information, determine whether a corresponding node fails;
in response to failure of the node, send failure information to multiple Object-based Storage Devices (OSDs) under the node;
in response to the multiple OSDs receiving the failure information, according to the failure information, select a Monitor to send down information, and set states of the multiple OSDs to be down; and
in response to the Monitor receiving the down information, update an OSDMap on the basis of the down information, and send the updated OSDMap to OSDs under other nodes of the multiple nodes;
determine whether a corresponding primary Monitor is normal according to a failure node;
in response to the corresponding primary Monitor being abnormal, send Monitor failure information to the multiple OSDs under the node.

9. The computer device according to claim 7, the computer instructions, upon execution by the at least one processor, is further configured to cause the at least processor to:
in response to the corresponding primary Monitor being normal, send node failure information to the multiple OSDs under the node.

10. The computer device according to claim 7, the computer instructions, upon execution by the at least one processor, is further configured to cause the at least processor to:
determine whether the other nodes connected to the corresponding primary Monitor are failure nodes; and
in response to any one node in the other nodes connected to the corresponding primary Monitor is not a failure node, confirm that the corresponding primary Monitor is normal.

11. The computer device according to claim 10, the computer instructions, upon execution by the at least one processor, is further configured to cause the at least processor to:
in response to all the other nodes connected to the corresponding primary Monitor being failure nodes, confirm that the corresponding primary Monitor is abnormal, and setting a state of the corresponding primary Monitor to be down.

12. The computer device according to claim 7, the computer instructions, upon execution by the at least one processor, is further configured to cause the at least processor to:
in response to the failure information being node failure information, select the corresponding primary Monitor to send the down information.

13. The computer device according to claim 7, the computer instructions, upon execution by the at least one processor, is further configured to cause the at least processor to:

in response to the failure information being primary Monitor failure information, select a standby Monitor to send the down information; and select a new primary Monitor, and the standby Monitor synchronizes the down information to the new primary Monitor.

14. The computer-readable storage medium according to claim 8, the computer program, when executed by at least one processor, cause the at least processor to:

in response to the corresponding primary Monitor being normal, send node failure information to the multiple OSDs under the node.

15. The computer-readable storage medium according to claim 8, the computer program, when executed by at least one processor, cause the at least processor to:

determine whether the other nodes connected to the corresponding primary Monitor are failure nodes; and in response to any one node in the other nodes connected to the corresponding primary Monitor is not a failure node, confirm that the corresponding primary Monitor is normal.

16. The computer-readable storage medium according to claim 15, the computer program, when executed by at least one processor, cause the at least processor to:

in response to all the other nodes connected to the corresponding primary Monitor being failure nodes, confirm that the corresponding primary Monitor is abnormal, and setting a state of the corresponding primary Monitor to be down.

17. The computer-readable storage medium according to claim 8, the computer program, when executed by at least one processor, cause the at least processor to:

in response to the failure information being node failure information, select the corresponding primary Monitor to send the down information.

18. The method for processing cluster node failure according to claim 1, wherein the node failure comprises active breakpoint or an Intelligent Platform Management Interface (IPMI) having a power-off operation.

19. The method for processing cluster node failure according to claim 1, wherein the OSDMap being a map of the OSDs, and stores information of the OSDs in the cluster, and changes of OSD nodes.

20. The method for processing cluster node failure according to claim 19, the changes of the OSD nodes comprising at least one of: process exit, node addition, node exit, changes of node weights.

* * * * *